United States Patent Office 2,731,392
Patented Jan. 17, 1956

2,731,392

DETHIOLIZING HYDROCARBONS

James L. Meadows, Wiley P. Ballard, and William B. Chandler, Port Arthur, Tex., assignors to The Texas Company, New York, N. Y., a corporation of Delaware Application September 30, 1952, Serial No. 312,292

16 Claims. (Cl. 196—32)

This invention relates to certain improvements in the treatment of hydrocarbons with alkali metal hydroxides in organic solvents to effect dethiolizing of the hydrocarbons.

The invention is concerned with a dethiolizing process in which the hydrocarbon is treated with alkali metal hydroxide in an organic solvent, such as an alkanolamine or a glycol ether, which contributes to the effectiveness of the alkaline material in the reaction in which the mercaptans are removed from the hydrocarbons. The invention relates to a process in which the treating solution is regenerated for re-use and is adapted for an operation in which a cyclic flow of dethiolizing solution is maintained between the dethiolizing zone and the regenerating zone for the repeated reactivation and re-use of the dethiolizer solution. In such operations there is a gradual build-up of water in the treating solution from the oxidation of mercaptans and the neutralization of the alkali metal hydroxide and there is an accumulation of undesirable salts and impurities. The present invention provides an efficient method of separating such deleterious constituents from the treating solution and for rejecting them from the system.

In accordance with the invention a portion of the treating solution is withdrawn from the dethiolizing-regenerating cycle and treated to cause phase separation into an upper layer containing the major portion of the organic solvent and a lower layer essentially aqueous containing only minimum amounts of the organic solvent. The undesired salts are water soluble and are largely contained in the lower or aqueous phase. The upper layer is returned to the dethiolizing-regenerating cycle and the lower layer is rejected from the cycle. Preferably the lower layer is contacted with the hydrocarbon charging stock to the system to pretreat it and to effect absorption in the hydrocarbon charge of the small amount of organic solvent which may be contained in the lower layer. The aqueous treating solution from which the contained organic solvent has been leached by the charging stock and which contains the harmful salts is withdrawn from the system. In this way the undesirable salts are removed from the treating cycle with practically no loss in the organic solvent.

For the purpose of effecting the phase separation of the treating solution withdrawn from the dethiolizer-regenerator cycle, several procedures may be employed in accordance with the invention. Solid alkali metal hydroxide may be added to the solution to raise the alkaline concentration and cause phase separation or the treating solution may be subjected to distillation to distill off a sufficient proportion of water to cause phase separation. In another alternative the treating solution is heated to a temperature above that at which the hydrocarbon is being treated to cause the desired phase separation.

The invention is particularly adapted for the dethiolizing of the lower boiling hydrocarbons, such as gasoline, naphtha and kerosene. In practicing the invention the hydrocarbon is contacted with a dethiolizer solution comprising an alkali metal hydroxide, such as potassium hydroxide or sodium hydroxide, in an organic solvent, such as a glycol ether or an alkanolamine or mixtures thereof. Preferred glycol ethers are diethylene glycol monomethyl ether commonly known as methyl Carbitol and ethylene glycol monomethyl ether commonly known as methyl Cellosolve, and the preferred alkanolamines are the lower alkanolamines such as monoethanolamine and monoisopropanolamine. An advantageous solvent is one composed of a major portion of the glycol ether and a minor portion of the alkanolamine, as for example, 95% methyl Carbitol and 5% monoethanolamine. In treating the hydrocarbon a substantially complete removal of mercaptans is readily effected. The used treating solution is directed to a regenerator and subjected to regeneration as by oxidizing with air and the reactivated solution is recycled to the treating zone. A portion of the treating solution is withdrawn from the cycle either continuously or at intervals. In one method the operation is continued without withdrawal of treating solution until the normality has been reduced to a predetermined point whereupon a portion of the solution is withdrawn for phase separation. In another method a portion of treating solution is regularly or continuously withdrawn and replaced with fresh or regenerated reagent so as to maintain a substantially constant normality of the solution. The withdrawn solution is concentrated by removal of a sufficient portion of water to cause phase separation, or solid alkali metal hydroxide is added to cause the phase separation. As another alternative the withdrawn solution is merely heated sufficiently that phase separation occurs. The upper layer or organic solvent-rich phase is returned to the cycle and the lower layer, the predominantly aqueous phase which contains the harmful salts, is rejected from the cycle. The aqueous phase solution is preferably contacted with the hydrocarbon charging stock before it enters the cycle. The hydrocarbon leaches out the small quantity of organic solvent contained in the solution and brings it back into the cycle upon entering the treating zone. The spent caustic containing the salts which reduce the dethiolizing efficiency of the reagent is withdrawn from the system.

For the purpose of more fully describing the invention reference is now had to the accompanying drawings wherein.

Figure 1:
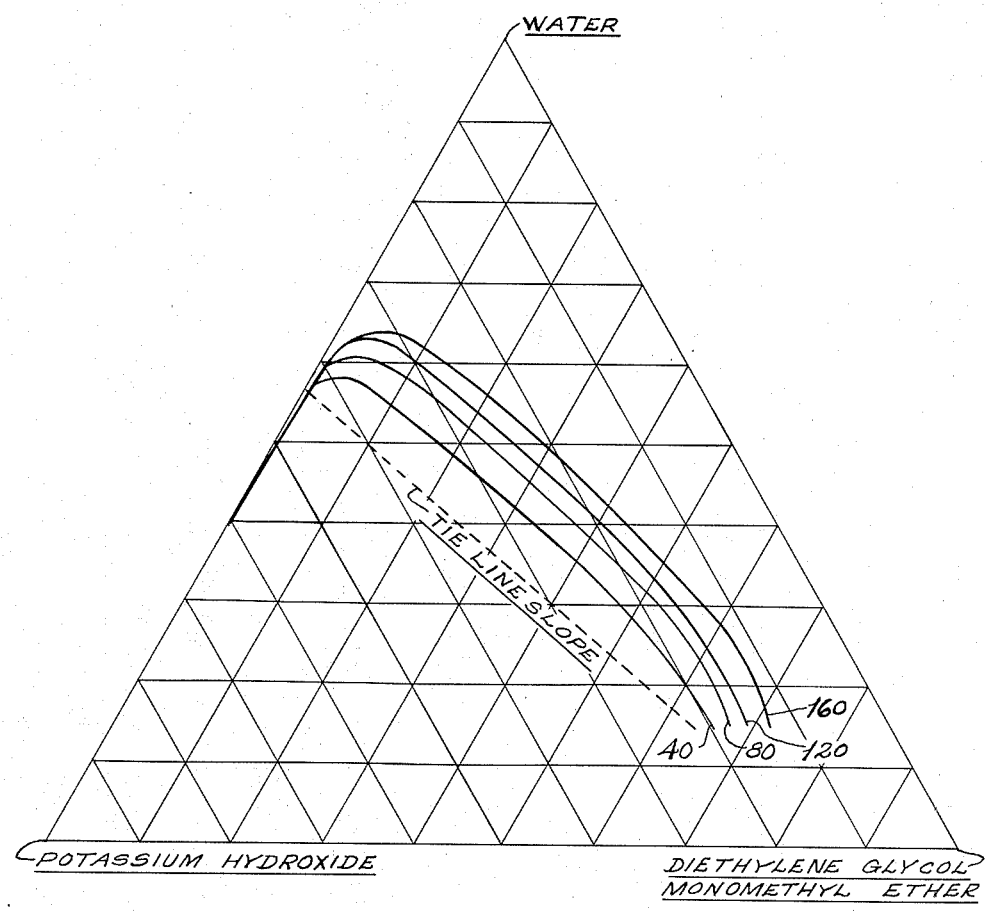
Figure 1 is a tri-linear graph showing the phase relationships for various compositions of potassium hydroxide water and diethylene glycol monomethyl ether and showing phase separation loci at a series of temperatures.

In obtaining the data plotted in Figure 1 a series of tests was made with mixtures containing various proportions of potassium hydroxide, water and diethylene glycol monomethyl ether and the phase separation points were determined for four temperatures, namely 40° F., 80° F., 120° F., and 160° F. by analysis of the two separate phases. The several curves in the drawings represent the loci of the phase separation points at these temperatures. If the gross composition of a mixture is known and is located on the diagram, a line through the point parallel to the tie line slope will intercept the locus of the phase separation points at the composition of the two phases which result from the initial mixture of known gross composition, and the weight fraction of each phase is inversely proportional to the linear distance from the phase composition point to the gross composition point. It should be mentioned that the curves show the phase separation points for pure components and do not exactly represent the conditions for phase separation for a used treating solution. In practice the used solution may contain the extraneous potassium salts, such as phenolates, and sulfur compounds, such as mercaptides and disulfides, so that the phase separation points of the used solution will deviate somewhat from the curves of the graph. However, the curves do constitute a useful guide for the operator and portray the principles of the process.

Figure 2:
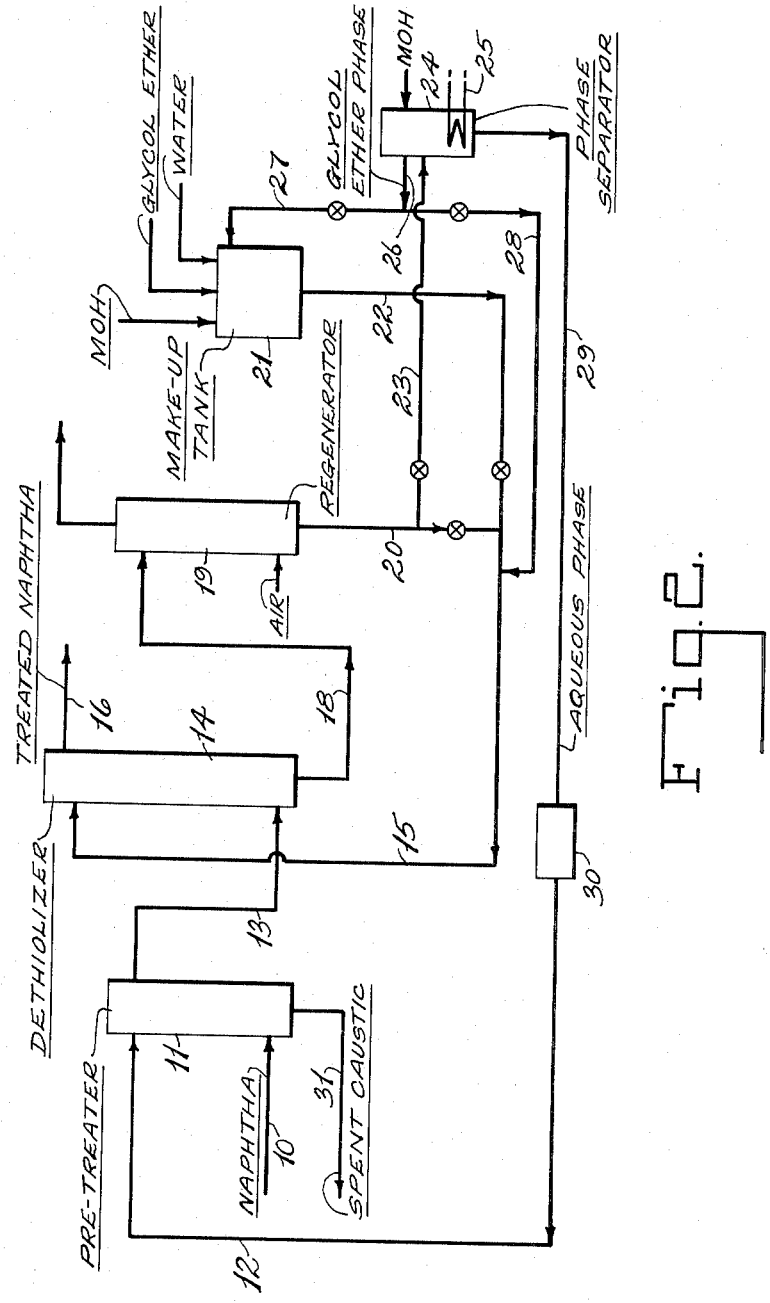
Figure 2 is a flow diagram showing a preferred embodiment of the process.

In describing the invention with reference to Figure 2 the process will be outlined as applied to the treatment of naphtha with a reagent comprising aqueous alkali metal hydroxide and a glycol ether, such as methyl Carbitol or methyl Cellosolve. The naphtha charging stock is directed through a charging line 10 to a pretreater or leacher 11 in which the naphtha is contacted with an alkaline solution introduced through line 12 as is hereinafter described. The naphtha containing glycol ether absorbed from the alkaline solution passes through line 13 to a dethiolizer 14 wherein it is contacted with treating solution introduced through line 15. The dethiolizer may consist of a single contacting tower or of a plurality of treating units as may be desired. The treated naphtha is removed from the dethiolizing zone through line 16. It may be washed with water to recover any contained glycol ether and sent to tankage.

The used treating solution is drawn from the dethiolizer 14 and directed through line 18 to a regenerator 19 wherein it is contacted with air to effect reactivation. The reactivated solution is withdrawn through line 20 and is recycled through line 15 to the dethiolizer 14. Make-up dethiolizer solution is prepared in tank 21 with alkali metal hydroxide, glycol ether and water. The make-up solution, as may be needed, is directed through line 22 for addition to the recycle treating solution passing through line 15 to the dethiolizer.

In accordance with the invention a portion of the treating solution is regularly withdrawn from line 20 at intervals or continuously and is directed through line 23 to a phase separator 24. A heating coil 25 may be provided to maintain the desired temperature for the phase separation. In this separator phase separation is accomplished by merely raising the temperature above that maintained in the treating cycle or by increasing the concentration of the alkaline content so as to cause phase separation. The increased concentration is effected either by heating to distill off water or by adding solid alkali metal hydroxide. When adding the solid hydroxide it is not necessary to raise the temperature in the phase separator 24 to accomplish the desired phase separation. However, by raising the temperature a reduced quantity of added alkali metal hydroxide is required to obtain the phase separating point.

In the phase separator 24 the solution is separated into an upper layer or glycol ether-rich phase and a lower layer which is essentially an aqueous phase. The glycol ether-rich phase is withdrawn through line 26 and directed either through line 27 to the make-up tank 21 or through line 28 for combining directly with the recycle treating solution in line 15. The aqueous phase is withdrawn through a line 29 to an accumulator tank 30. This aqueous phase contains the bulk of the harmful salts which have been thus separated from the treating solution withdrawn from the dethiolizer-regenerator cycle. The aqueous phase solution collected in tank 30 is directed through line 12 to the pretreater 11 wherein the small content of glycol ether is recovered by the naphtha and is returned in the naphtha to the dethiolizer treating zone. The spent caustic is withdrawn through a line 31 from the system. Thus by regularly withdrawing this spent caustic the excessive build-up of concentrations of the salts which impair the dethiolizing efficiency of the treating solution is prevented.

The character of the phase separations accomplished by the invention is readily shown by a typical phase separation. In one run a naphtha stock was subjected to dethiolization by treatment with an aqueous solution of potassium hydroxide in methyl Carbitol, with regeneration of the treating solution and re-use of the reactivated solution. Periodically during the run used treating solution was subjected to phase separation by the addition of solid KOH. In general sufficient solid KOH was added to give an upper layer having a KOH normality of about 3.5. The lower layer of the phase separation containing non-titratable salts was rejected from the dethiolizing-regenerating cycle. The treating solution was analyzed before the phase separation to determine the KOH, methyl Carbitol and water contents, and after the addition of the KOH the resulting upper and lower layers of the phase separation were similarly analyzed. The KOH content was determined by two methods, one by titrating with standard acid to phenolphthalein end point and the other by the flame photometer. The methyl Carbitol content was determined by infrared absorption. The following figures give the results obtained in one of the phase separations, effected at a temperature of 90 F. In the first table the figures for KOH were obtained by titrating with standard acid to a phenolphthalein end point and in the second table such figures were obtained by the flame photometer method.

*By phenolphthalein method*

|  | Before Phase Separation | KOH Added | Total | After Phase Separation | |
| --- | --- | --- | --- | --- | --- |
|  |  |  |  | Upper Layer | Lower Layer |
| KOH, gms. | 1,185 | 1,200 | 2,385 | 1,228 | 1,080 |
| Methyl Carbitol, gms. | 3,830 |  | 3,830 | 3,430 | 73 |
| Water, gms.¹ | 5,565 | 216 | 5,781 | 3,242 | 2,667 |
| Total, gms. | 10,580 | 1,416 | 11,996 | 7,900 | 3,820 |
| KOH, wt. percent | 11.20 | 84.75 |  | 15.54 | 28.27 |
| Methyl Carbitol, wt. percent | 36.20 |  |  | 43.42 | 1.91 |
| Water, wt. percent ¹ | 52.60 | 15.25 |  | 41.04 | 69.82 |

¹ By difference.

*By flame method*

|  | Before Phase Separation | KOH Added | Total | After Phase Separation | |
| --- | --- | --- | --- | --- | --- |
|  |  |  |  | Upper Layer | Lower Layer |
| KOH, gms. | 1,593 | 1,200 | 2,793 | 1,293 | 1,153 |
| Methyl Carbitol, gms. | 3,830 |  | 3,830 | 3,430 | 73 |
| Water, gms.¹ | 5,157 | 216 | 5,373 | 3,177 | 2,594 |
| Total, gms. | 10,580 | 1,416 | 11,996 | 7,900 | 3,820 |
| KOH, wt. percent | 15.06 | 84.75 |  | 16.37 | 30.18 |
| Methyl Carbitol, wt. percent | 36.20 |  |  | 43.42 | 1.91 |
| Water, Wt. Percent ¹ | 48.74 | 15.25 |  | 40.21 | 67.91 |

¹ By difference.

From the preceding data it will be seen that the amount of methyl Carbitol in the lower layer of the phase separation was very small indeed. It will also be noted that in the phase separation the upper layer contains the greater portion of the solution.

An analysis of the data clearly shows that by means of the phase separation the undesirable salts which may be conveniently referred to as K-ions are being removed from the system. The titration method of analysis is more representative of the free KOH contents than the flame photometer method. The latter method is representative of the potassium content calculated as KOH. The difference between the figures by the two methods, therefore, constitutes an approximtae indication of the non-titratable or undesirable salts which are being removed from the system. Referring to the analyses, for the upper layer the difference in the KOH contents by the two methods is 65 gms., which constitutes 47.10% of the total of both layers, and for the lower layer the difference is 73 gms., which constitutes 52.90% of the total of both layers. The weight per cent of the lower layer is 32.5% of the total of both layers. The data thus demonstrate that the undesirable salts are being eliminated from the system and are thus not permitted to build up in the dethiolizing-regenerating cycle in harmful proportions.

Obviously many modifications and variations of the invention, as hereinbefore set forth, may be made without departing from the spirit and scope thereof, and therefore only such limitations should be imposed as are indicated in the appended claims.

We claim:

1. In the dethiolizing of hydrocarbons wherein the hydrocarbon is contacted with a treating solution of aqueous alkali metal hydroxide in an organic solvent selected from the group consisting of glycol ethers and alkanolamines, the treating solution treated to remove mercaptans and regenerate said solution for re-use in dethiolizing, the process that comprises withdrawing regenerated treating solution from the regeneration step and concentrating it to cause autogenous phase separation into a solvent-rich phase and an aqueous phase containing impurities, returning the solvent-rich phase to the dethiolizing step and withdrawing the aqueous phase containing the impurities.

2. The process according to claim 1 in which said organic solvent is diethylene glycol monomethyl ether.

3. In the dethiolizing of hydrocarbons wherein the hydrocarbon is contacted with a treating solution of aqueous alkali metal hydroxide in an organic solvent selected from the group consisting of glycol ethers and alkanolamines, the treating solution treated to remove mercaptans and regenerate said solution for re-use in dethiolizing, the process that comprises withdrawing regenerated treating solution from the regeneration step and adding sufficient solid alkali metal hydroxide to it to cause autogenous phase separation of the alkali enriched solution into a solvent-rich phase and an aqueous phase containing impurities, returning the solvent-rich phase to the dethiolizing step and withdrawing the aqueous phase containing the impurities.

4. The process according to claim 3 in which said organic solvent is diethylene glycol monomethyl ether.

5. In the dethiolizing of hydrocarbons wherein the hydrocarbon is contacted with a treating solution of aqueous alkali metal hydroxide in an organic solvent selected from the group consisting of glycol ethers and alkanolamines, the treating solution treated to remove mercaptans and regenerate said solution for re-use in dethiolizing, the process that comprises withdrawing regenerated treating solution from the regeneration step and subjecting it to distillation to remove a sufficient amount of water to cause autogenous phase separation of the residue into a solvent-rich phase and an aqueous phase containing impurities, returning the solvent-rich phase to the dethiolizing step and withdrawing the aqueous phase containing the impurities.

6. The process according to claim 5 in which said organic solvent is diethylene glycol monomethyl ether.

7. In the dethiolizing of hydrocarbons wherein the hydrocarbon is contacted with a treating solution of aqueous alkali metal hydroxide in an organic solvent selected from the group consisting of glycol ethers and alkanolamines, the treating solution treated to remove mercaptans and regenerate said solution for re-use in dethiolizing, the process that comprises withdrawing regenerated treating solution from the regeneration step and raising the temperature thereof sufficiently to cause autogenous phase separation into a solvent-rich phase and an aqueous phase containing impurities, returning the solvent-rich phase to the dethiolizing step and withdrawing the aqueous phase containing the impurities.

8. The process according to claim 7 in which said organic solvent is diethylene glycol monomethyl ether.

9. In the dethiolizing of hydrocarbons wherein hydrocarbon charging stock is contacted in a dethiolizing zone with a treating solution of aqueous alkali metal hydroxide in an organic solvent selected from the group consisting of glycol ethers and alkanolamines, the treating solution treated to remove mercaptans and regenerate said solution for re-use in dethiolizing and regenerated solution recycled to the dethiolizing zone, the process that comprises withdrawing used treating solution from the regeneration step to a separating zone and concentrating it therein to cause autogenous phase separation into a solvent-rich phase and an aqueous phase containing impurities, contacting said charging stock, prior to introduction to the dethiolizing zone, with alkaline material from the aqueous phase of the separating zone to thereby absorb from the alkaline material contained organic solvent and withdrawing from the system the alkaline material containing said impurities and substantially free of organic solvent.

10. The process according to claim 9 in which said organic solvent is diethylene glycol monomethyl ether.

11. In the dethiolizing of hydrocarbons wherein hydrocarbon charging stock is contacted in a dethiolizing zone with a treating solution of aqueous alkali metal hydroxide in an organic solvent selected from the group consisting of glycol ethers and alkanolamines, the treating solution treated to remove mercaptans and regenerate said solution for re-use in dethiolizing and regenerated solution recycled to the dethiolizing zone, the process that comprises withdrawing used treating solution from the regeneration step to a separating zone and adding sufficient alkali metal hydroxide thereto to cause autogenous phase separation of the alkali enriched solution into a solvent-rich phase and an aqueous phase containing impurities, contacting said charging stock, prior to introduction to the dethiolizing zone, with alkaline material from the aqueous phase of the separating zone to thereby absorb from the alkaline material contained organic solvent and withdrawing from the system the alkaline material containing said impurities and substantially free of organic solvent.

12. The process according to claim 11 in which said organic solvent is diethylene glycol monomethyl ether.

13. In the dethiolizing of hydrocarbons wherein hydrocarbon charging stock is contacted in a dethiolizing zone with a treating solution of aqueous alkali metal hydroxide in an organic solvent selected from the group consisting of glycol ethers and alkanolamines, the treating solution treated to remove mercaptans and regenerate said solution for re-use in dethiolizing and regenerated solution recycled to the dethiolizing zone, the process that comprises withdrawing used treating solution from the regeneration step to a separating zone and subjecting it to distillation therein to remove a sufficient amount of water to cause autogenous phase separation of the residue into a solvent-rich phase and an aqueous phase containing impurities, contacting said charging stock, prior to introduction to the dethiolizing zone, with alkaline material from the aqueous phase of the separating zone to thereby absorb from the alkaline material contained organic solvent and withdrawing from the system the alkaline material containing said impurities and substantially free of organic solvent.

14. The process according to claim 13 in which said organic solvent is diethylene glycol monomethyl ether.

15. In the dethiolizing of hydrocarbons wherein hydrocarbon charging stock is contacted in a dethiolizing zone with a treating solution of aqueous alkali metal hydroxide in an organic solvent selected from the group consisting of glycol ethers and alkanolamines, the treating solution treated to remove mercaptans and regenerate said solution for re-use in dethiolizing and regenerated solution recycled to the dethiolizing zone, the process that comprises withdrawing used treating solution from the regeneration step to a separating zone and raising the temperature of the treating solution sufficiently to cause autogenous phase separation into a solvent-rich phase and an aqueous phase containing impurities, contacting said charging stock, prior to introduction to the dethiolizing zone, with alkaline material from the aqueous phase of the separating zone to thereby absorb from the alkaline material contained organic solvent and withdrawing from the system the alkaline material containing said impurities and substantially free of organic solvent.

16. The process according to claim 15 in which said organic solvent is diethylene glycol monomethyl ether.

References Cited in the file of this patent

UNITED STATES PATENTS

| | | |
|---|---|---|
| 2,186,398 | Yabroff | Jan. 9, 1940 |
| 2,546,345 | Meadows et al. | Mar. 27, 1951 |
| 2,556,157 | Brown et al. | June 12, 1951 |
| 2,560,178 | Krause et al. | July 10, 1951 |
| 2,578,602 | Rosenstein | Dec. 11, 1951 |
| 2,641,572 | Meadows et al. | June 9, 1953 |